(12) United States Patent
Raju et al.

(10) Patent No.: US 8,798,247 B2
(45) Date of Patent: Aug. 5, 2014

(54) MULTIMEDIA CALLER RING DISTRIBUTION SYSTEM AND METHOD

(75) Inventors: Venkatesh Raju, Richardson, TX (US); Youngky Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1563 days.

(21) Appl. No.: 11/394,747

(22) Filed: Mar. 31, 2006

(65) Prior Publication Data

US 2007/0047727 A1 Mar. 1, 2007

Related U.S. Application Data

(60) Provisional application No. 60/713,500, filed on Sep. 1, 2005.

(51) Int. Cl.
*H04M 15/00* (2006.01)

(52) U.S. Cl.
USPC ............... 379/114.13; 379/257; 455/567

(58) Field of Classification Search
CPC ... H04M 3/02; H04M 3/42017; H04M 3/487; H04M 3/4872; H04M 3/4878; H04M 15/00; H04M 2215/0192; H04M 19/04; H04M 19/041; G06Q 30/02; G06Q 30/0273

USPC .............. 379/373.01, 373.02, 257, 114.13, 379/207.16; 455/567

See application file for complete search history.

(56) References Cited

U.S. PATENT DOCUMENTS

| | | | |
|---|---|---|---|
| 6,603,844 B1* | 8/2003 | Chavez et al. | 379/114.13 |
| 2003/0086558 A1* | 5/2003 | Seelig et al. | 379/373.01 |
| 2006/0023862 A1* | 2/2006 | Sutcliffe | 379/257 |

OTHER PUBLICATIONS

Raju, Venkatesh, et al., "Multimedia Caller Ring Information Service," Filing Date—Mar. 31, 2006, U.S. Appl. No. 11/395,195, Specification (37 pgs.) and Drawings (3 sheets).

* cited by examiner

*Primary Examiner* — Antim Shah

(57) ABSTRACT

A system is provided to manage distribution of ring back multimedia content. The system includes a data store component to store the multimedia content and to associate the multimedia content with a called system. The system includes a distribution component operable when a caller system calls the called system to provide the multimedia content as ring back to the caller system. The content may be non-ring tone content.

22 Claims, 3 Drawing Sheets ered to as the caller. The party to whom the call is placed can be referred to as the called party. The audible signal that indicates to a called party that an incoming call has been placed is known as a ring tone. The audible signal that indicates to a caller that the telephone of the called party is ringing is known as a ring back. The caller typically hears the ring back until the called party accepts the call. That is, the ring back is heard until the call is connected.
MULTIMEDIA CALLER RING DISTRIBUTION SYSTEM AND METHOD

CROSS-REFERENCE TO RELATED APPLICATIONS

This application claims priority to U.S. Provisional Application No. 60/713,500 filed Sep. 1, 2005, and entitled "Multimedia Caller Ring Information Service," by Venkatesh Raju and Dr. Youngky Kim, which is incorporated herein by reference for all purposes. This application is related to U.S. Pat. No. 7,908,803, filed Mar. 31, 2006, entitled "Multimedia Caller Ring Information Service", Venkatesh Raju et al. inventors, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure relates to telephone services. More specifically, but not by way of limitation, a method and system are described that provide for a multimedia ring back service that allows a subscriber to the service to specify multimedia content to be played as a ring back signal and, in some embodiments, allows a caller to respond to the ring back content.

BACKGROUND OF THE INVENTION

When a telephone call is placed, the party initiating the call can be referred to as the caller. The party to whom the call is placed can be referred to as the called party. The audible signal that indicates to a called party that an incoming call has been placed is known as a ring tone. The audible signal that indicates to a caller that the telephone of the called party is ringing is known as a ring back. The caller typically hears the ring back until the called party accepts the call. That is, the ring back is heard until the call is connected.

SUMMARY OF THE INVENTION

In one embodiment, a system is provided to manage distribution of ring back multimedia content. The system includes a data store component to store the multimedia content and to associate the multimedia content with a called system. The system includes a distribution component operable when a caller system calls the called system to provide the multimedia content as ring back to the caller system.

In another embodiment, a method is provided for ring back multimedia content distribution. The method includes providing multimedia content, and identifying multimedia content for distribution. The method includes identifying called systems to provide the multimedia content as a ring back. In some embodiments, the content may be non-tone ring back content.

In still other embodiments, a method of providing advertisements as ring backs is provided that includes providing advertisements that may be used as ring backs.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

It should be understood at the outset that although an exemplary implementation of one embodiment of the present invention is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

In embodiments of the present disclosure, a service is provided that allows a subscriber to the service to specify the content that will be provided as a ring back when a caller calls the subscriber. The content can be multimedia content such as video clips, audio clips, advertisements, weather reports, financial reports, sports scores, jokes, or other types of content that might include audio portions, video portions, graphical or text portions, combinations of audio, video, graphics or text, and/or other types of media. Any such category of content can be referred to as a genus of multimedia content. It should be understood that the term "video", as used herein, does not necessarily refer only to images displayed at a high enough frame rate to suggest motion but could also refer to static images, images displayed at a lower frame rate such as in a slide show, or other types of image displays.

In some embodiments, the caller can respond to content received as a ring back. For example, a caller might request more information about a product featured in an advertisement transmitted during ring back.

A telecommunications operator, such as a wireless communications service provider, might provide this service, which can be referred to as the Multimedia Caller Information Service (MCIS). A message sent from the operator to a caller via this service can be referred to as an MCIS message. A subscriber to the MCIS service can inform the operator of the content that the subscriber wishes to be sent to callers as a ring back. When a caller calls the subscriber, the operator sends the selected content to the caller in an MCIS message. Thus, ring back may be provided to the caller in an MCIS message. Embodiments of the present invention are directed to telecommunications systems and information technology architecture to support the content provided as a ring back, as well as the selection and delivery of this content. The term "operator" herein refers to a telecommunications service provider and not to a person who provides assistance to a phone user in completing a telephone call, as for example in completing an "operator assisted call" in a plain old telephone system (POTS).

Figure 1:
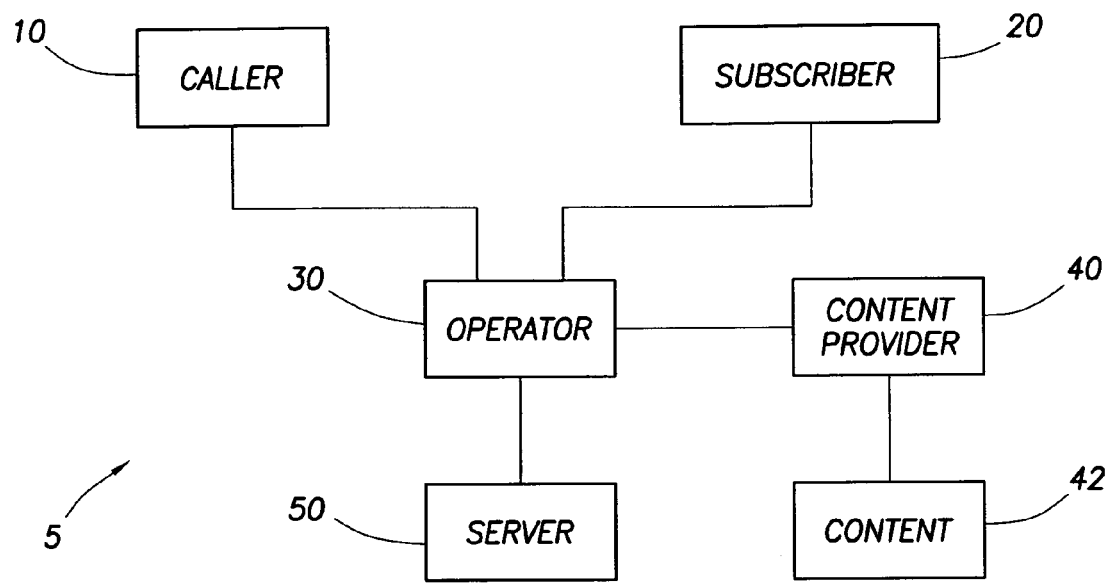
FIG. 1 illustrates a system for providing a multimedia ring back according to an embodiment of the present disclosure.

FIG. 1 illustrates an embodiment of a system 5 for providing multimedia ring back content. In this illustration, a caller 10 calls a subscriber 20 of an MCIS service provided by an operator 30. The subscriber 20 receives the call. Herein the term "the caller 10" may sometimes refer to the person or party placing the call, but will generally be used to refer to the device used to call the subscriber 20. Similarly, herein the term "the subscriber 20" may sometimes refer to the persons or party receiving the call from the caller 10, but will generally be used to refer to the device used to receive the call and make other selections or choices. The caller 10 and subscriber 20 may be mobile handsets, such as mobile telephones, personal digital assistants (PDAs), portable computers, such as laptop, notebook, and tablet computers, or other mobile communication or computing systems, and the like. In some embodiments, the caller 10 and subscriber 20 may also be computers, such as desktop, workstation, and kiosk computers. In still other embodiments, the caller 10 and subscriber 20 may be standard home or business telephone. The caller 10 and subscriber 20 may both be the same type of system, or may be combinations of any of the aforementioned systems.

At various points during the call setup process and/or after the call is connected, the operator 30 might send the caller 10 an MCIS message containing multimedia content chosen by the subscriber 20. The multimedia content 42 might be provided by the operator 30 or by a third party content provider 40. When the content 42 is an advertisement, the content provider 40 might be the company that provides the advertisement. When an advertisement can be selected in the manner described below, the content 42, the content provider 40, and the means for selection can be referred to as an advertiser system. The multimedia content might be stored on a server 50 from which the operator 30 can retrieve the content and transmit it to the caller 10. FIG. 1 is presented only as an example and it should be understood that other configurations of these components or of other components might provide similar functionality.

The MCIS service is invoked at the operator 30 when a caller 10 places a call to a subscriber 20 to the service. The operator 30 may send an MCIS message to a caller 10 under several different circumstances. For example, an MCIS message might be sent to a caller 10 while the subscriber 20 is being located. In this case, the MCIS message would act as a substitute for any delay locating the subscriber 20, as well as the typical ring back signal heard when the telephone of the subscriber 20 is ringing. Other occasions when an MCIS message might be sent include any instances selected by the subscriber 20, such as when the subscriber 20 has placed the caller 10 on hold, or when the subscriber 20 is unreachable, busy, or has rejected the call. The MCIS messages sent to a caller 10 could be the same in all of these circumstances, different for each circumstance, or the same in some circumstances and different in others. Hereinafter, the MCIS messages will be referred to as occurring during ring back, but it should be understood that the MCIS messages could be transmitted during any of these or other circumstances. The MCIS messages may continue to be sent to a caller 10 until the caller 10 terminates the call or the subscriber 20 connects the call to communicate with the caller 10.

The operator 30 might offer the subscriber 20 a plurality of labels that can be referred to as MCIS tags. MCIS tags, or keywords, define the content that will be displayed on the telephone of a caller 10 and therefore allow the subscriber 20 to decide what the caller 10 will see and/or hear during ring back. MCIS tags may be text such as words or phrases, images, audio clips, video clips, or a combination thereof. When the subscriber 20 wishes a piece of content to be sent to a caller 10 as a ring back, the subscriber 20 selects the MCIS tag associated with that content and informs the operator 30 of the selection. In other cases, the subscriber simply selects an MCIS tag and the content that is associated with the tag is determined in other manners, as described below. In some instances, the content or MCIS message(s) may be otherwise selected by or assigned to the subscriber 20. In either case, this process can be referred to as registering a tag.

The subscriber 20 can register one or more MCIS tags at the time of subscription to the MCIS service. Thereafter, when a caller 10 calls the subscriber 20, the operator 30 sends the content associated with a registered tag to the caller 10 over the existing signaling channel in an MCIS message. The subscriber 20 may add, delete, or modify MCIS tags at any time after the initial registration of one or more tags. The operator 30 may offer a web interface or similar interface to allow the subscriber 20 to conveniently make such changes. Alternatively, the subscriber 20 can make a request to the operator 30 in writing, over the telephone, or in other manners.

The operator 30 may also provide a catalog or other listing component 60 from which the subscriber 20 can choose one or more tags. The catalog might be displayed on a web page or other medium that facilitates browsing and selecting tags. The catalog might include summaries or previews of the content associated with each tag so that the subscriber 20 could browse for content that is appealing. As described below, the content might include advertisements that allow the subscriber 20 and/or the operator 30 to receive a fee at the time of registration, when the content is delivered to the caller 10, or otherwise. The summaries in the catalog might include and be organized by the fee paid if the subscriber 20 registers such an advertisement, and/or the fee paid if a caller 10 receives such an advertisement, and/or the fee paid if a caller 10 selects such an advertisement. The act of a caller 10 selecting an advertisement may be referred to as "click through." This listing of advertisements and their associated fees, which can be a portion of a revenue component 70, allows the subscriber 20 to browse for advertisements that have the potential to pay the subscriber 20 the most money, for example. The catalog of tags, their summaries, and their associated content might be maintained on the server 50.

The subscriber 20 might register a list of MCIS tags, each associated with one or more different pieces of content that might be displayed when the caller 10 calls. When a caller 10 places a call to the subscriber 20, the operator 30 might use an automated algorithm, described in detail below, to select one of the tags and then send the content associated with that tag to the caller 10. In some cases, more than one piece of content can be associated with a single tag. An algorithm may determine which piece of content will be associated with such a tag each time that tag is selected. The algorithms may be software-based applications that execute on the server 50.

The operator 30 may generate the multimedia content to be transmitted during ring back and may associate the content with an MCIS tag. Alternatively, a third party content provider 40, such as a commercial enterprise, a media company, an advertiser, an advertising agency, or a government agency, might provide the content to the operator 30. The operator 30 would then associate the content with an MCIS tag and make the tag and associated content available to subscribers 20. Alternatively, the content provider 40 might perform the association of the content with the tag. The content provider 40 might compensate the operator 30 for each tag or set of tags for which the content provider provides content. This compensation can be referred to as purchasing a tag.

As an example, an advertiser could inform the operator 30 that it wishes to have a particular advertisement associated with a particular MCIS tag. For example, a vehicle manufacturer might pay the content provider to have the manufacturer's vehicle advertisements delivered whenever the subscriber 20 selects automobile, sports car, truck, or SUV tags. The advertiser might pay the operator 30 for one or more of these tags and then provide the operator 30 with the content for the advertisement that is to be associated with the tag. The operator 30 would perform the association of the tag with the advertisement and store the tag and associated advertisement on the server 50. The operator 30 could maintain a list of MCIS tags and associated advertisements and could retrieve and transmit an appropriate advertisement when a caller 10 calls a subscriber 20 who has registered one of the tags.

More than one advertisement might be associated with an MCIS tag. For instance, a tag could be the vehicle manufacturer's name and advertisements for several different makes or models of vehicles could be associated with that tag. The operator 30 might use an automated algorithm, described in more detail below, to determine which advertisement will be delivered with each call when a subscriber 20 registers a tag with multiple associated advertisements.

In some embodiments, the subscriber 20 may not use the tag method, but instead may select a particular advertisement, video clip, or other content to be used as the ring back. For example, the subscriber 20 might be aware of, or browse the Internet, the operator 30, or the content provider 40 for content or advertisements. The subscriber might locate desired content or advertisements, for example, on a vehicle manufacturer's web site. The web site might provide any specific payment or fee details, or other related information useful for the subscriber 20 to decide whether to select the advertisement. The subscriber 20 could then select to use a particular advertisement for the subscriber's 20 ring back. Numerous methods for distributing and selecting this content could be used, for example, such as systems and techniques currently used to distribute music (such as online), ring tones, or other content distribution systems and methods. Other such systems and methods will readily suggest themselves to one skilled in the art in view of the present disclosure and all of which are within the spirit and scope of the present disclosure.

In an embodiment, a caller 10 can respond to the content received in an MCIS message. For example, a caller 10 who is sent an advertisement as a ring back might respond to the advertisement by requesting more information about the advertised product or service. A caller 10 responding to an advertisement can request to receive an email, a phone call, or some other information delivery medium. The caller 10 may, for example, elect to disconnect the call to the subscriber 20 and immediately speak with a sales or customer service representative about the advertisement. The MCIS service could record the caller's response and cause the caller 10 to receive the requested information either at the time of the call or at a later time. The operator 30 can flag the caller's response as a "click-through" event for revenue generation purposes, as described below. When the content is not an advertisement, a caller 10 might provide a different type of response and/or request to receive a different type of information. For example, when the content is a political advertisement, the caller 10 might be asked to donate time or make a financial contribution.

A caller 10 might respond to the content in several ways. For example, the caller 10 might click on a hyperlink in the content, press a standard key on the caller's telephone, press a dedicated key on the caller's telephone specifically designed for responding to MCIS messages, press a "soft key" whose function is defined by a context or operation state, enter a voice command, click on a button in the telephone's graphical user interface, click on the graphical user interface screen or a portion of the screen, or respond in other manners.

Traditionally, when a called party answers a call, the ring back sent to the caller ceases. In an embodiment, the MCIS message being sent to the telephone of a caller 10 can terminate when a subscriber 20 accepts the caller's call. Alternatively, the caller 10 can choose to keep the content on display during the call. If the caller 10 retains the content on display, the caller 10 might respond to the content while talking to the subscriber 20 or might abandon the call and return to the content. In another alternative, the caller 10 might temporarily remove the content from the display during the call and return to the content after terminating the call. In yet another alternative, upon the subscriber 20 answering a call, the caller 10 might abandon both the call and the content by hanging up the telephone.

An MCIS message might have a structure that allows multimedia content to be transmitted to a caller 10 and allows the message to handle a caller's response to the message. In an embodiment, an MCIS message contains a body and an optional query section. The body of an MCIS message is rendered on the caller's telephone as required for the medium of the message. The body may include embedded text, HTML, images, audio, video, hyperlinks, multimedia session information described by a Session Description Protocol (SDP) parameter, or other data formats capable of delivering multimedia content.

Since the body of an MCIS message is of a multimedia nature, it should be clear that the caller's telephone should be a type capable of playing multimedia content. Thus, the term "telephone", as used herein, refers to any device capable of performing standard telecommunications functions and, and in some embodiments, of playing multimedia content, such as mobile telephones provided with video screens. When an MCIS message is sent to a caller 10 who has a device incapable of playing multimedia content, such as a device without a video screen, appropriate modifications to the MCIS messages may be made to deliver only the portion(s) of the message, such as only the audio portion. Another alternative may include delivering and playing a different message, or other messages, perhaps even a standard ring back.

The query section of an MCIS message can be used to solicit information from a caller 10. The query section may provide a caller 10 with the ability to request more information on an item in an MCIS message via email, SMS, MMS, an immediate call back, or other means. The query section may also provide a caller 10 with the capability to dismiss MCIS messages. For example, a caller 10 might choose to dismiss the current MCIS message and allow the MCIS service to send another MCIS message or a caller 10 might choose to dismiss the current MCIS message and inhibit further MCIS messages. Details on a caller 10 dismissing an MCIS message are provided below.

Embodiments provide for revenue generating and sharing arrangements between the operator 30 and a content provider 40 and between the operator 30 and a subscriber 20. For example, a content provider 40 might provide ring back content in the form of an advertisement to the operator 30 and might pay the operator 30 to make the content available to subscribers 20. In one case, the content provider 40 might pay the operator 30 for each advertisement-related tag or set of tags that the content provider 40 purchases from the operator 30. In another case, the content provider 40 might pay the operator 30 whenever a subscriber 20 registers an advertisement-related tag or set of tags, or perhaps even a single advertisement. In yet another case, the content provider 40 might pay the operator 30 whenever one of the content provider's advertisements is sent to a caller 10, regardless of whether the caller 10 selects the advertisement. In still another case, the content provider 40 might pay the operator 30 whenever a caller 10 responds, such as by requesting more information, for example with a click through.

The operator 30 might pay or otherwise compensate a subscriber 20 under circumstances similar to these. That is, the operator 30 might pay the subscriber 20 when the subscriber 20 registers an advertisement-related tag or set of tags, when an advertisement associated with a tag registered by the subscriber 20 is sent to a caller 10, regardless of whether the caller 10 selects the advertisement, or when a caller 10 selects an advertisement associated with a tag registered by the subscriber 20.

In some circumstances, a subscriber 20 might pay the operator 30 for content and/or the operator 30 might pay the content provider 40 for content. For example, a content provider 40 might require payment for some types of premium content such as real-time sports scores, cartoons, and financial market analysis and tips. The content provider 40 may charge for such premium content on a per unit basis or offer a period or volume-based subscription.

The amounts paid when content is registered, displayed, or selected can vary based on several factors. For example, the operator 30 may apply different payment rates to a content provider 40 based on the type and/or length of the content. The business relationship between the operator 30 and the content provider 40 may also be a factor in the payment for content. For example, if the content delivered by the content provider 40 is a mix of advertising and premium content, the operator 30 and the content provider 40 may have varying fee agreements or agree to waive each other's fees.

If an advertisement has "click-through" capability, i.e., it includes hyperlinks or other connections back to an advertiser or to a company or service represented by an advertiser, the operator 30 may levy an additional charge on the content provider 40. The operator 30 may share a portion of this click-through revenue with any subscriber 20 who registers the advertisement or the MCIS tag associated with the advertisement.

In one embodiment, a subscriber 20 simply subscribes to the MCIS service and has no control of the content that is sent to callers 10. The operator 30 specifies the tag and the content for each call made to the subscriber 20. In other embodiments, a subscriber 20 can register one or more tags and each tag can have one or more pieces of content associated with it. In one case, a subscriber 20 registers only one tag and only one piece of content is associated with that tag. When a caller 10 calls the subscriber 20, the operator 30 simply retrieves the content associated with the tag and transmits the content to the caller 10 in an MCIS message. That is, the operator 30 may search through content that has been developed in-house or by the content provider 40 for the content that matches the selected MCIS tag. Upon finding the associated content, the operator 30 generates an MCIS message containing the content and transmits the MCIS message to the caller 10.

In the cases where a subscriber 20 has registered multiple tags or where a subscriber 20 has registered only one tag but multiple pieces of content are associated with that tag, a different piece of content may be sent to a caller 10 for each call the caller 10 places to a subscriber 20. In an embodiment, a selection process occurs to determine the content that will be transmitted to the caller 10. The selection process determines the tag that will be used for a particular call and/or the content that will be associated with the tag being used for a particular call.

In one case, the operator 30 may partner with a web search company, enter the MCIS tag into a search engine, and use the search results to populate the MCIS message. The search may be a text-based or audio-based query or, in the future, may be an image-based or video-based query. In other words, the selection process involves associating a tag with the results of a web search.

In another case, the operator 30 may classify some MCIS tags as special tags and fetch data from appropriate sources to generate an MCIS message. For example, the operator 30 may recognize the MCIS tag "weather alerts" as a special tag and fetch weather alert information from government agencies or news sources to populate an MCIS message. In this case, the selection process involves associating a special tag with the most recent data available for that tag.

In yet another case, an algorithm maintained by the operator 30 and running on the server 50 can select a tag and/or select the content that is to be associated with a tag for each call. The algorithm's selection process can be based on several different factors. In some embodiments, the selection algorithm may randomly select a tag from the subscriber's list of registered tags or may sequentially select tags starting at some position in the list. When more than one piece of content is associated with the selected tag, the algorithm may use another random or sequential process to select the content that will be associated with tag.

In other embodiments, the algorithm may select a particular tag and/or a particular piece of content based on a priority setting for the tags and/or content. For example, the operator 30 or a content provider 40 might wish to have a particular piece of content be transmitted to callers 10 more often than other pieces of content. Such content might be given a higher priority rating than other content so that the selection algorithm selects that content more often than other content. A content provider 40 might pay the operator 30 a higher fee for content that has a higher priority rating.

In other embodiments, the algorithm may select a particular tag and/or a particular piece of content based on the time of the day, the time of the year, or some other time aspect. For example, an advertisement for a breakfast restaurant might be sent to a caller 10 in the morning and an advertisement for a dinner restaurant might be sent in the evening. Alternatively, an advertisement for a beach vacation might be sent in the summer and an advertisement for a ski vacation might be sent in the winter. Alternatively, an advertisement for a floral arrangement delivery service may be sent timely in advance of Valentine's Day and/or Mother's Day.

The selection algorithm might also provide for sending different advertisements to a caller 10 based on the caller's location. Location information might be ascertained from the area code in the caller's caller ID information and/or the Automatic Number Identification (ANI) parameter in an origination message, from GPS information provided by the caller's telephone, from Home Location Register (HLR) data and/or Visitor's Location Register (VLR) data, or from other sources. An advertisement with a location aspect appropriate for the caller's location can then be sent to the caller 10. For example, if GPS-based information indicates that a caller 10 is near a particular intersection, an advertisement for a business near that intersection could be sent to the caller 10. Alternatively, if a caller's caller ID information indicates that the caller 10 is in a particular city, an advertisement for a restaurant in that city might be sent to the caller 10.

The selection algorithm might use the caller ID of a caller 10 in other ways to determine the content the caller receives. For example, a subscriber 20 might have the capability to designate the content that will be sent to individual callers 10 or groups of callers 10 based on the caller IDs of the callers 10. Such a capability might allow the subscriber 20 to have one type of message sent to family, for example, and another type of message sent to friends, and so on. The selection algorithm would be able to take these subscriber preferences into account in selecting an MCIS tag and/or in associating content with a selected tag.

The revenue capable of being generated by advertisements in MCIS messages may also be a factor in the algorithm's selection process. The amount a content provider 40 pays the operator 30 for transmitting an advertisement can be referred to as the revenue aspect of the piece of content. The revenue aspect may be based on various factors such as the priority of the advertisement, the location of the caller 10, or the time of day or year. When different advertisements pay the operator 30 different amounts of money, the algorithm may select the advertisements that have the potential to pay the operator 30 the most money. For example, the algorithm might determine that an advertisement for a restaurant that is transmitted to a caller 10 during the evening while the caller 10 is near the restaurant will pay the operator 30 more than an advertisement with other payment parameters and may ensure that the higher paying advertisement is transmitted.

Complicated service level agreements (SLAs) may be defined that include a maximum rate of ad distribution per first unit of time that will be paid for—as for example a maximum number of ads per ten minute time interval—and a maximum total number of ads per second unit of time that will be paid for—as for example a maximum number of ads per billing cycle. A series of maximum number of ads per first unit of time may be defined for different times of day—for example a maximum rate during the two hours preceding the primary dining hour, a maximum rate during the primary dining hour, and a maximum rate during the remaining hours. Other payment and/or billing models, which may be referred to as economic models, readily suggest themselves to one skilled in the art and are comprehended in the present disclosure.

The selection algorithm might also use the connection status of a call or the presence status of the subscriber 20 to determine the content that will be included in an MCIS message. Call connection status might include "locating" (i.e., the subscriber's telephone is ringing and ring back is occurring), "busy" (i.e., the subscriber 20 is on another call), and other statuses. Presence status might include "away" (i.e., the subscriber 20 is unable to answer a call), "do not disturb" (i.e., the subscriber 20 does not wish to accept calls), "off" (i.e., the subscriber's telephone is turned off), and other statuses. The subscriber 20 might have the capability to designate that each of these statuses or various combinations of these statuses will cause different ring back content to be sent to a caller 10. The selection algorithm can take these subscriber preferences into account when selecting a tag and/or determining content that will be associated with a tag. For example when the subscriber 20 selected "do not disturb", certain content may be transmitted to the caller 10 followed by a message from the subscriber 20 indicating that the subscriber 20 is busy at the moment. Other information or combinations of content may be provided as well.

An MCIS tag is not restricted to being purchased by only one advertiser. Several advertisers may purchase the same tag and each advertiser may pay a different price for the tag and provide different content for the tag. In an embodiment, the number of times the selection algorithm selects the content for a tag purchased by a particular advertiser is related to the price paid by that advertiser for the tag. For example, the MCIS tag "pizza" may be purchased by several restaurants and the operator 30 may associate advertisements from each of the restaurants with that tag. Advertisements from advertisers who paid more for the tag may be transmitted to callers 10 more often than advertisements from advertisers who have agreed to pay less for the tag.

In an embodiment, the operator 30 may offer an advertiser exclusive use of an MCIS tag for an additional fee. The selection algorithm may take such an arrangement into account when determining how often to deliver the content associated with such a tag.

As mentioned previously, callers 10 can have the capability to suppress content sent to them by subscribers 20. In an embodiment, during the first MCIS message received upon placing a call, a caller 10 can respond to the message by indicating that no further MCIS messages are to be sent. Some callers 10 may wish to suppress all MCIS messages, including the first, or to suppress MCIS messages with certain types of content (e.g., advertising). To enable such control, the caller's operator (which may or may not be the same as the subscriber's operator 30) may offer an MCIS restriction service that indicates to the subscriber's operator 30 whether MCIS messages are allowed, disallowed, or allowed with specific content restrictions. The operator 30 might charge a fee for a service to block content, or may prohibit such blocking. In some embodiments, the operator 30, not the subscriber 20, may control the selection of the MCIS tags and related content, and/or selected content or advertisements.

A caller 10 may also be a subscriber to an MCIS service that may or may not be the same MCIS service provided by the operator 30 previously mentioned. Such a caller 10 may receive content that the caller 10 wishes to make available as ring back content to parties placing calls to the caller 10. For example, a caller 10 who receives a video clip in an MCIS message may wish to use that video clip as the content for the outgoing ring back signal delivered to parties calling the caller 10.

In an embodiment, an MCIS message can contain information that allows a caller 10 to obtain information associated with a piece of content delivered in the message. The caller 10 can then send that information to the caller's operator so that the content associated with the tag can be available as the caller's ring back content. Tag information may be embedded in an MCIS message as a code word that a caller 10 can copy, as a hyperlink that a caller 10 can click on to visit a web site containing a tag or content with download instructions, or in some other form. This allows callers 10 to easily populate their tag list with the tags of content, or selected content, such as an advertisement or information, they have received on calls to subscribers 20.

Advertisements and other content that appears on television, the Internet, or other media might have similar capabilities to provide a tag or other identifying information. In one embodiment, the tag may be an identifier, such as key word, serial or other number or identifier that identifies a single piece of MCIS content, such as a specific advertisement. A subscriber 20 could retrieve this tag information and make the associated content available as ring back content. For example, a music video played on television might display information that allows viewers to obtain a tag that will allow the viewers to use the video as ring back content. Revenue sharing arrangements between advertisers and subscribers 20 may be made for subscribers 20 who use advertisements obtained in this manner as ring back content.

While the above discussion has focused on a subscriber 20 providing multimedia ring back content to a caller 10, it should be clear that such content may be available to the subscriber 20 also. For example, if a subscriber 20 provides callers 10 with real-time sports scores as premium ring back content, the subscriber 20 might wish to have access to the score information also. In an embodiment, a subscriber 20 has the capability to retrieve any content that the subscriber 20 makes available to callers 10.

Operators 30 might use the MCIS service as a marketing tool to attract customers. For example, operators 30 might inform potential customers that subscribers 20 can earn money by providing advertisements as ring back content. Operators 30 might also offer free or discounted telephone service to subscribers 20 who display advertisements.

The MCIS service also allows subscribers 20 to express their personal tastes and interests by having customized multimedia content delivered to callers 10. Businesses can use the MCIS service to advertise products and services via a new channel for delivering interactive advertisements. A new channel is also provided for government agencies to deliver important news and alerts regarding events such as severe weather, natural disasters, missing children, and terrorism. The MCIS service also provides a new channel for media and content companies to promote new offerings such as music, movies, and games. It should be noted that advertisers place a premium on advertisements where the audience is considered to be a captive or attentive audience. The caller 10 is focused on and expecting to communicate with the subscriber 20. During the ring back time when the MCIS service provides this content, the caller 10 might be considered a captive audience, and thus advertisers might have more interest and be willing to pay premium prices for such advertisements.

A revenue model is also provided where an operator 30 charges subscribers 20 for registering MCIS tags. The operator 30 may use these revenues to defray the costs of purchasing content from third party content providers 40 such as news and media companies. A revenue sharing mechanism can exist between an operator 30 and a subscriber 20 when the ring back content provided by the subscriber 20 is an advertisement. Numerous other revenue models are disclosed herein and others will readily suggest themselves to one skilled in the art in light of the present disclosure, all of which are within the spirit and scope of the present disclosure.

Figure 2:
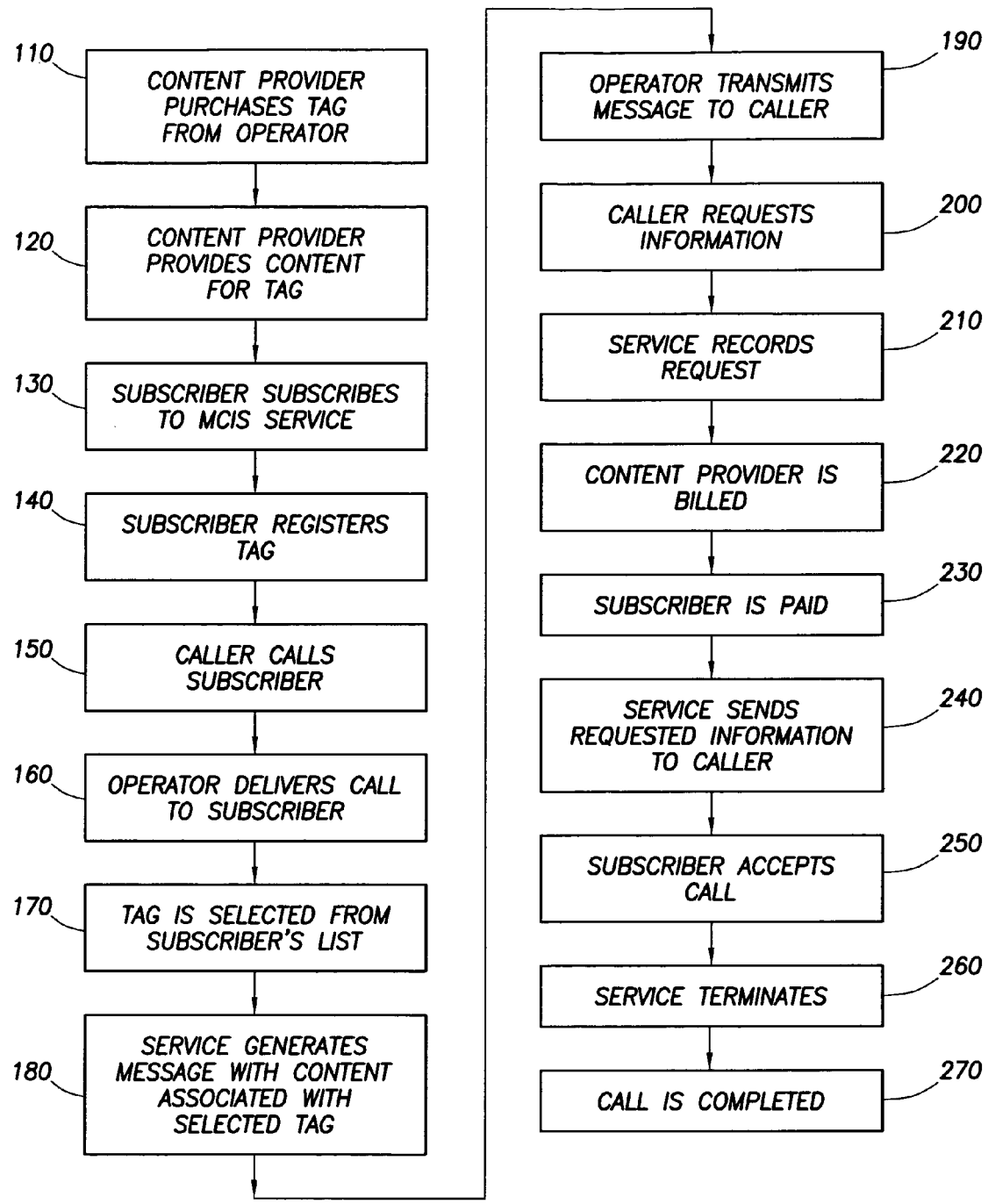
FIG. 2 illustrates a method for providing a multimedia ring back according to an embodiment of the present disclosure.

FIG. 2 illustrates an embodiment of a method by which an MCIS service can deliver multimedia ring back content to a caller and by which a subscriber to the MCIS service can be compensated for selecting an advertisement as the ring back content. It should be understood that this embodiment is provided only as an example of one set of transactions that might occur in one set of circumstances. All of the steps described below do not necessarily need to occur and the steps do not necessarily need to occur in the order stated. In some embodiments, some steps shown separately in FIG. 2 may be combined.

In box 110, a content provider 40 purchases a tag from a telecommunications network operator 30. In box 120, the content provider 40 generates multimedia content for the tag. The content may be associated with the tag by the operator 30 or by the content provider 40. In box 130, a subscriber 20 subscribes to an MCIS service offered by the operator 30. In box 140, the subscriber 20 registers the tag that was purchased by the content provider 40. That is, the subscriber 20 informs the operator 30 that the subscriber 20 wishes to use the content associated with the tag as the subscriber's ring back signal.

In box 150, a caller 10 calls the subscriber 20. The operator 30 delivers the call to the subscriber 20 in box 160. In box 170, the tag is selected from a list of other tags that the subscriber 20 has registered. In box 180, the MCIS service generates an MCIS message containing the content that is associated with the tag. In box 190, the operator 30 transmits the message to the caller 10.

The caller 10 requests more information about the content of the message in box 200. In this example, the message content can be assumed to be an advertisement and the caller 10 can be assumed to have requested information about a product featured in the advertisement. In box 210, the MCIS service creates a record that the request was made. In box 220, the content provider 40 is billed for the fact that information related to its advertisement was requested. In box 230, the subscriber 20 is paid for having made the advertisement available. In box 240, the MCIS service sends the requested information to the caller 10.

In box 250, the subscriber 20 accepts the caller's call. In box 260, the MCIS service terminates. That is, no further MCIS messages are sent to the caller 10. In box 270, the call between the caller 10 and the subscriber 20 is connected. In other embodiments, the subscriber 20 locates the content in other methods, such as described above, and selects the content to be delivered to the caller 10 as a ring back when the caller 10 calls the subscriber 20.

In some embodiments, the operator 30, such as the telecommunication provider, may provide the content, for example, the advertisements, news, or other content, regardless of whether the subscriber 20 subscribed to the content. In fact, the operator 30 may not even provide subscriber 20 with the option to select the content. For example, the subscriber 20, in this embodiment, may not be aware or able to control the content that the caller 10 receives when calling the subscriber 20. In this case, the operator 30 will control all decisions about the content.

Figure 3:
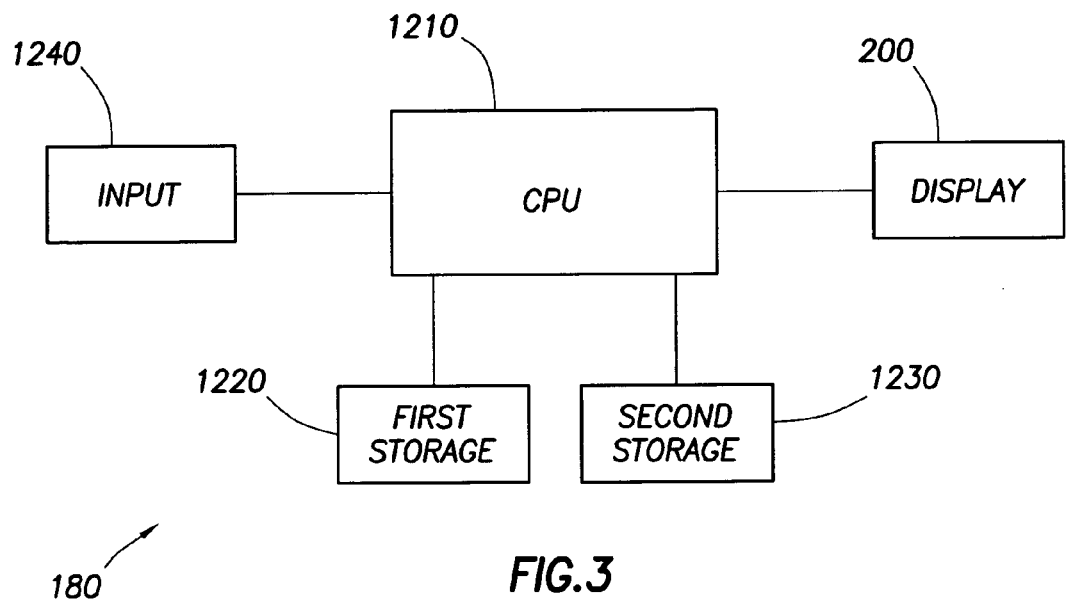
FIG. 3 illustrates a block diagram of a mobile device operable for some of the various embodiments of the present disclosure.

The all or portions of the system described above may be implemented on any hand-held mobile electronic device 180 such as is well known to those skilled in the art. An exemplary mobile handset system 180 for implementing one or more embodiments disclosed herein is illustrated in FIG. 3. The mobile handset 180 includes a processor 1210 (which may be referred to as a central processor unit or CPU) that is coupled to a first storage area 1220, a second storage area 1230, an input device 1240 such as a keypad, and an output device such as a display screen 200. As is well known to those skilled in the art, the mobile handset 180 may comprise a transmit/receive antenna (not shown) and radio frequency transmit/receive circuitry (not shown), some of which may be implemented by the processor 1210. In an embodiment, some of the transmit/receive antenna and radio frequency transmit/receive circuitry may be combined with some of the processor 1210 as a system-on-a-chip (SOC).

The processor 1210 may be implemented as one or more CPU chips and may execute instructions, codes, computer programs, or scripts that it accesses from the first storage area 1220 or the second storage area 1230. The processor 1210 may be implemented using one or more digital signal processors (DSPs), programmable logic devices (PLDs), field programmable gate arrays (FPGAs), application specific integrated circuits (ASICs), and/or other specialized semiconductor logic device. The first storage area 1220 might be a non-volatile memory such as flash memory. Mobile handset 180 data would typically be installed in the first storage area 1220. The second storage area 1230 might be firmware or a similar type of memory. The device's operating system would typically be installed in the second storage area 1230.

Figure 4:
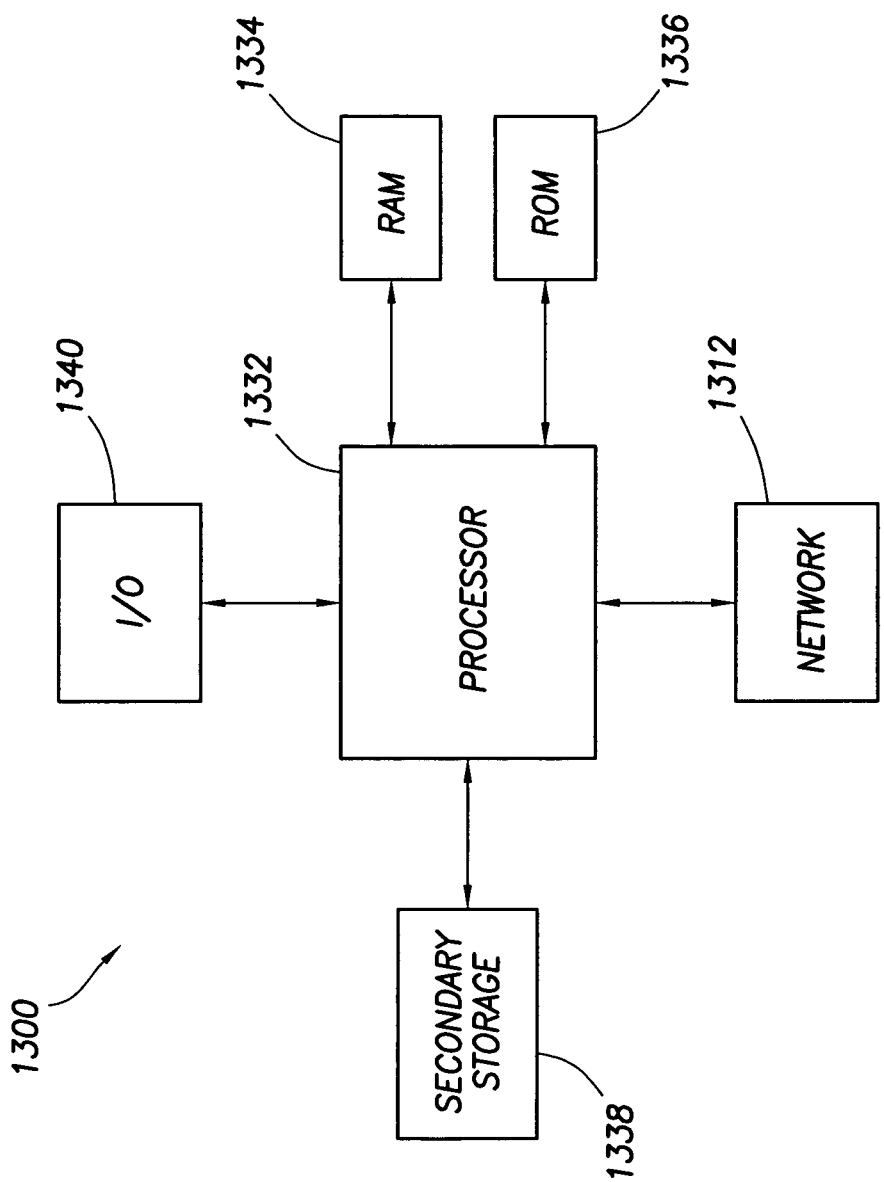
FIG. 4 illustrates a block diagram of a computer system operable for some of the various embodiments of the present disclosure.

Various systems above may also be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) devices 1340, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs that are loaded into RAM 1334 when such programs are selected for execution. The ROM 1336 is used to store instructions and perhaps data that are read during program execution. ROM 1336 is a non-volatile memory device that typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O devices 1340 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1312 may enable the processor 1332 to communicate with the Internet or one or more intranets. With such a network connection, it is contemplated that the processor 1332 might receive information from a network or might output information to a network in the course of performing the above-described method steps.

Such information, which may include data or instructions to be executed using processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1332 executes instructions, codes, computer programs, or scripts that it accesses from hard disk, floppy disk, optical disk (these various disk-based systems may all be considered secondary storage 1338), ROM 1336, RAM 1334, or the network connectivity devices 1312.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system operable to manage distribution of ring back multimedia content, comprising:
    a data store component configured to store a plurality of multimedia content associated with a called system;
    a distribution component configured to:
    in response to identifying a call from a caller system to the called system, select one of the plurality of multimedia content based on an amount of a fee paid to a subscriber associated with the called system and provide the selected multimedia content as a ring back to the caller system, and
    in response to selection of an advertisement in the provided multimedia content by the caller system during the call, provide the fee to the subscriber associated with the called system; and
    a server associated with the data store component, the server configured to provide, in response to a request from the subscriber to associate multimedia content with the called system, a list of advertisements and, for each advertisement, a fee paid to the subscriber by an advertiser when the each advertisement is selected, a fee paid when the subscriber registers the each advertisement with the called system, a fee paid when the caller system receives the each advertisement when calling the called system, and a fee paid when the caller system selects the each advertisement during the call.

2. The system of claim 1, further comprising a component configured to associate a first multimedia content as ring back when a first caller system calls the called system and further configured to associate a second multimedia content as ring back when a second caller system calls the called system.

3. The system of claim 2, wherein the distribution component is further configured to use caller identification to differentiate the first and second caller systems.

4. The system of claim 1, further comprising a telecommunication operator system configured to select the one of the plurality of multimedia content based on revenue generated for the telecommunication operator.

5. The system of claim 1, further comprising an advertiser system including the plurality of multimedia content and a component configured to select the one of the plurality of multimedia content as ring back.

6. The system of claim 1, wherein the selected multimedia content is the advertisement.

7. A method of operating a communications server to provide ring back multimedia content distribution, the method comprising:
    identifying a plurality of multimedia content associated with a called system;
    providing, in response to a request from the subscriber to associate multimedia content with the called system, a list of advertisements and, for each advertisement, a fee paid to the subscriber by an advertiser when the each advertisement is selected, a fee paid when the subscriber registers the each advertisement with the called system, a fee paid when the caller system receives the each advertisement when calling the called system, and a fee paid when the caller system selects the each advertisement during the call;
    in response to identifying a call from a caller system to the called system, selecting one of the plurality of multimedia content based on an amount of a fee paid to a subscriber associated with the called system;
    providing the selected multimedia content as a ring back to the called system; and
    in response to selection of an advertisement in the provided multimedia content by the caller system during the call, providing the fee to the subscriber associated with the called system.

8. The method of claim 7, further comprising an identifier identifying the one of the plurality of multimedia content.

9. The method of claim 8, wherein the identifier is a tag identifying a genus of the one of the plurality of multimedia content.

10. The method of claim 8, further comprising:
    viewing the one of the plurality of multimedia content;
    determining the identifier associated with the one of the plurality of multimedia content; and
    using the identifier to select the one of the plurality of multimedia content to provide as ring back for callers to the called systems.

11. The method of claim 7, wherein the one of the plurality of multimedia content is selected from a group of content consisting of audio advertisements, multimedia advertisements, audio-video content, and video only content.

12. The method of claim 7, further comprising:
    providing a time aspect associated with the multimedia content; and
    using a time when a called system is called and further using the time aspect to determine the one of the plurality of multimedia content to provide as ring back multimedia content.

13. The method of claim 7, further comprising:
    providing a location aspect associated with the one of the plurality of multimedia content;
    determining a location of a caller system; and
    using the location of a caller system and further using the location aspect of the multimedia content to determine the one of the plurality of multimedia content to provide as ring back multimedia content to the caller system.

14. The method of claim 7, further comprising using a tag priority to determine the one of the plurality of multimedia content to provide to the caller system.

15. The method of claim 7, further comprising using a called party presence status to determine the one of the plurality of multimedia content to provide to the caller system.

16. The method of claim 15, wherein the called party presence status comprises at least one of:
    busy;
    away;
    do not disturb; and
    off.

17. A system configured to provide advertisements as ring backs, the system comprising:
    a server configured to:
        provide, in response to a request from a subscriber associated with a called system, a list of the advertisements and a fee paid to the subscriber when the advertisements are provided as ring backs to callers calling the called system, wherein the list further includes, for each advertisement, a fee paid when the subscriber registers the each advertisement with the called system, a fee paid when a caller system receives the each advertisement when calling the called system, and a fee paid when the caller system selects the each advertisement during the call; and
        associate with the called system a plurality of the advertisements from the list; and
    a distribution component configured to:
    in response to identifying a call from the caller system to the called system, select one of the plurality of advertisements based on an amount of the fee paid to the subscriber and provide the selected advertisement as a ring back to the caller system; and
    provide, in response to selection of an advertisement in the provided multimedia content by the caller system during the call, the fee to the subscriber associated with the called system.

18. The system of claim 17, wherein a subscriber selects the advertisements that will be provided when a caller calls the subscriber.

19. The system of claim 17, wherein an operator selects the advertisements that will be provided when a caller calls the subscriber.

20. The system of claim 18, wherein the caller system is selected from a group of systems consisting of mobile handsets, mobile telephones, portable telephones, personal communication systems (PCS), wired telephones, personal digital assistants (PDAs), laptop computers, tablet computers, portable computers, personal computers, workstation computers, and Internet appliances.

21. The system of claim 18, wherein the advertisements are multimedia content.

22. The system of claim 18, wherein the advertisements are audio and video content advertisements.

* * * * *